(12) United States Patent
Xiao et al.

(10) Patent No.: US 11,378,834 B2
(45) Date of Patent: Jul. 5, 2022

(54) ULTRASONIC DIMMING SYSTEM AND DIMMING WINDOW ASSEMBLY

(71) Applicants: BEIJING BOE SENSOR TECHNOLOGY CO., LTD., Beijing (CN); BOE TECHNOLOGY GROUP CO., LTD., Beijing (CN)

(72) Inventors: Yuelei Xiao, Beijing (CN); Yue Li, Beijing (CN); Fengchun Pang, Beijing (CN); Xue Cao, Beijing (CN); Wenbo Chang, Beijing (CN); Yifan Wu, Beijing (CN); Jing Yu, Beijing (CN); Qiang Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/214,271

(22) Filed: Mar. 26, 2021

(65) Prior Publication Data
US 2022/0035195 A1 Feb. 3, 2022

(30) Foreign Application Priority Data
Jul. 31, 2020 (CN) .......................... 202010762114.5

(51) Int. Cl.
*G02F 1/1333* (2006.01)
*E06B 9/24* (2006.01)
(Continued)

(52) U.S. Cl.
CPC ............ *G02F 1/13338* (2013.01); *E06B 9/24* (2013.01); *G02F 1/137* (2013.01);
(Continued)

(58) Field of Classification Search
CPC ............... E06B 2009/2464; E06B 9/24; G02F 1/13338; G06F 3/041; G06F 3/0412;
(Continued)

(56) References Cited

U.S. PATENT DOCUMENTS

2018/0321842 A1* 11/2018 Lee ......................... G06F 3/041
2021/0113196 A1* 4/2021 Imai ....................... A61B 8/469
(Continued)

*Primary Examiner* — Mariam Qureshi
(74) *Attorney, Agent, or Firm* — Brooks Kushman P.C.

(57) ABSTRACT

An ultrasonic dimming system includes: a function processing module including: a first unit for generating a first electrical signal for locating a target object in a first operation state, to enable an ultrasonic transducer structure to generate first ultrasonic waves, and generating a second electrical signal for identifying finger touch position in a second operation state, to enable the ultrasonic transducer structure to generate second ultrasonic waves; a second unit for detecting reflected first ultrasonic waves to obtain target position information of the target object in the first operation state, and detecting reflected second ultrasonic waves to obtain finger touch position information in the second operation state; a third unit for controlling the ultrasonic transducer structure to perform directional sounding for the target object in the first operation state; a fourth unit for sending a control signal to the dimming glass structure to perform dimming in the second operation state.

18 Claims, 5 Drawing Sheets

(51) Int. Cl.
  *G02F 1/137*    (2006.01)
  *G02F 1/1339*   (2006.01)
  *G02F 1/1343*   (2006.01)

(52) U.S. Cl.
  CPC .... *G02F 1/13394* (2013.01); *G02F 1/133302* (2021.01); *G02F 1/133377* (2013.01); *G02F 1/134309* (2013.01); *E06B 2009/2464* (2013.01)

(58) Field of Classification Search
  CPC ..... G06F 2203/041; G06F 2203/04103; G06F 2203/04112; B32B 2457/208
  See application file for complete search history.

(56) References Cited

U.S. PATENT DOCUMENTS

| | | | |
|---|---|---|---|
| 2021/0151525 A1* | 5/2021 | Li | H01L 27/3234 |
| 2021/0165985 A1* | 6/2021 | Grip | G06F 3/044 |

\* cited by examiner

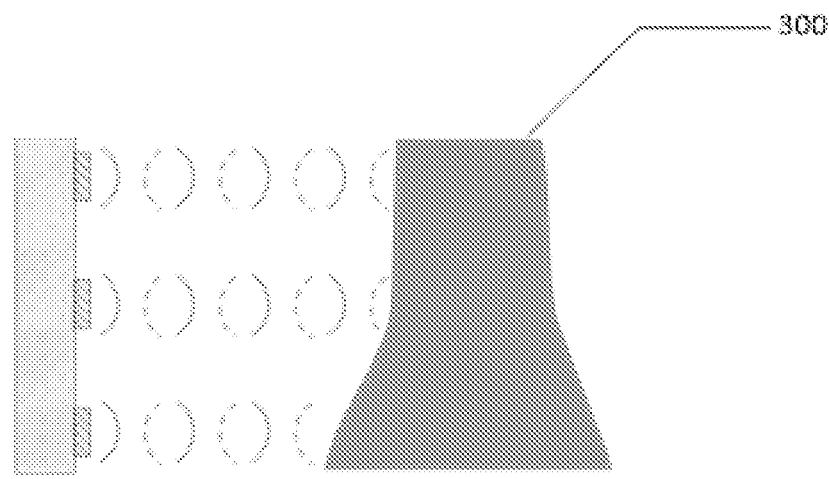
Fig. 8
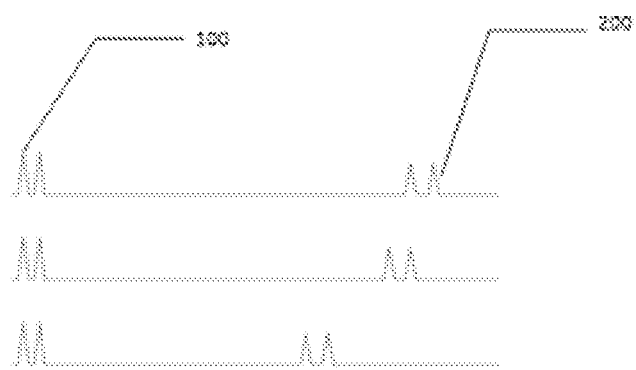
Fig. 9
| | X1 | X2 | X3 | ... | Xn-1 | Xn |
|---|---|---|---|---|---|---|
| Yn | A | B | A | | A | B |
| Yn-1 | B | A | B | | B | A |
| ... | | | | | | |
| Y3 | B | A | B | | B | A |
| Y2 | A | B | A | | A | B |
| Y1 | B | A | B | | B | A |
Fig. 10

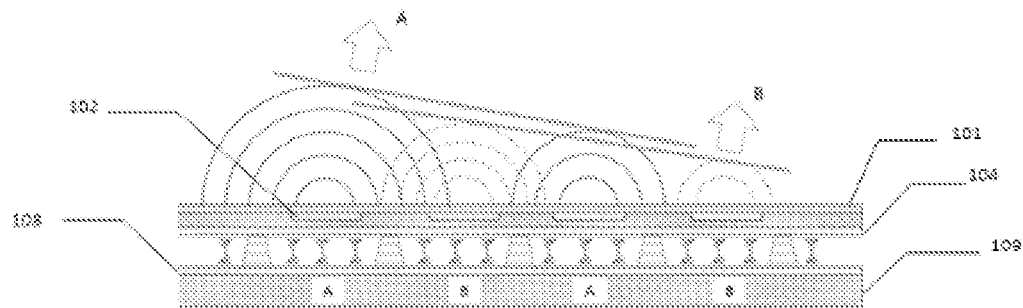
Fig. 11
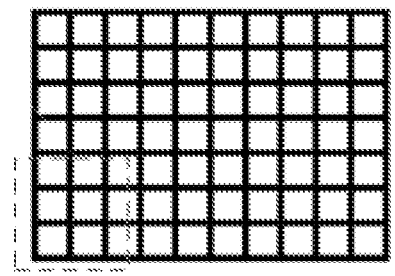
Fig. 12
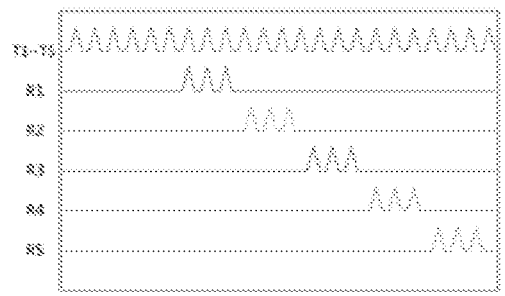
Fig. 13
Fig. 14

ULTRASONIC DIMMING SYSTEM AND DIMMING WINDOW ASSEMBLY

CROSS-REFERENCE TO RELATED APPLICATION

This application claims priority to Chinese Patent Application No. 202010762114.5 filed on Jul. 31, 2020, which is incorporated herein by reference in its entirety.

TECHNICAL FIELD

The present disclosure relates to the field of dimming glass technology, in particular to an ultrasonic dimming system and a dimming window assembly.

BACKGROUND

Electronically controlled dimming glass is a thin film with adjustable light transmittance made of a dye liquid crystal through Thin Film Transistor (TFT) Liquid Crystal Display (LCD) process, which may be used to make laminated glass, hollow glass and other glass assemblies used for car windows, architectural windows, or curtain walls. However, the dimming glass has a smaller application field and a single function, and is only used to adjust the light transmittance.

SUMMARY

An ultrasonic dimming system is provided in an embodiments of the present disclosure, and includes: a glass substrate, a dimming glass structure and an ultrasonic transducer structure sequentially disposed on the glass substrate, and a function processing module electrically coupled with the dimming glass structure and the ultrasonic transducer structure. The function processing module includes:

a first unit configured to, in a first operation state, generate a first electrical signal for locating a target object and send the first electrical signal to the ultrasonic transducer structure to enable the ultrasonic transducer structure to generate a first ultrasonic wave; and, in a second operation state, generate a second electrical signal for identifying a finger touch position and send the second electrical signal to the ultrasonic transducer structure to enable the ultrasonic transducer structure to generate a second ultrasonic wave;

a second unit configured to, in the first operation state, detect a reflected first ultrasonic wave to obtain target position information of the target object; and, in the second operation state, detect a reflected second ultrasonic wave to obtain finger touch position information;

a third unit configured to, in the first operation state, control the ultrasonic transducer structure to perform directional sounding for the target object according to the target position information;

a fourth unit configured to, in the second operation state, send a control signal to the dimming glass structure to perform dimming according to the finger touch position information.

In a possible embodiment of the present disclosure, the dimming glass structure includes: a first electrode on the glass substrate, a second electrode opposite to the first electrode, and liquid crystals between the first electrode and the second electrode; the ultrasonic transducer structure includes a third electrode, a fourth electrode disposed opposite to the third electrode, and a piezoelectric film layer between the third electrode and the fourth electrode; and the second electrode is reused as the third electrode.

In a possible embodiment of the present disclosure, the dimming glass structure further includes a spacer between the first electrode and the second electrode; the spacer includes a plate-shaped substrate and an array of hollow areas in the plate-shaped substrate; the liquid crystals are in each hollow area; the fourth electrode includes an array of block electrodes, the block electrodes are corresponding to the hollow areas in a one-to-one manner; and a center point of each block electrode coincides with a center point of the corresponding hollow area.

In a possible embodiment of the present disclosure, a cross section of the block electrode in a direction parallel to the glass substrate is circular; a cross section of the hollow area in the direction parallel to the glass substrate is circular; and a radius of the cross section of the block electrode is 0.65 to 0.75 times a radius of the cross section of the corresponding hollow area.

In a possible embodiment of the present disclosure, a thickness of the plate-shaped substrate in a direction perpendicular to the glass substrate is within a range of 10 um to 25 um; a distance between two adjacent ones of the hollow areas is within a range of 5 um to 10 um; and the radius of the cross section of each hollow area is within a range of 45 um to 47.5 um.

In a possible embodiment of the present disclosure, at least part of the block electrodes of the fourth electrode are touch electrodes; the touch electrodes include a plurality of transmitting electrodes and a plurality of receiving electrodes. In case that the finger touch position information includes finger sliding along a first direction, reflected ultrasonic signals are received by the plurality of receiving electrodes according to a first time sequence, and the dimming glass structure is controlled by the fourth unit to present a dark state. In case that the finger touch position information includes finger sliding along a second direction opposite to the first direction, reflected ultrasonic signals are received by the plurality of receiving electrodes according to a second time sequence, and the dimming glass structure is controlled by the fourth unit to present a bright state; the second time sequence is opposite to the first time sequence.

In a possible embodiment of the present disclosure, a sealant is disposed between the first electrode and the second electrode, and the sealant surrounds the spacer.

In a possible embodiment of the present disclosure, a transparent flexible substrate film layer is further disposed on a side of the fourth electrode away from the third electrode.

In a possible embodiment of the present disclosure, the first unit includes a first audio controller and a first signal generator; and the first audio controller is configured to, in the first operation state, control the first signal generator to generate the first electrical signal, and in the second operation state, control the first signal generator to generate the second electrical signal.

In a possible embodiment of the present disclosure, the third unit includes a second audio controller and a second signal generator; the second audio controller is configured to transmit an acquired audio signal to the second signal generator; and the second signal generator modulates the audio signal and an ultrasonic carrier frequency signal to obtain a modulated signal.

In a possible embodiment of the present disclosure, the first audio controller is reused as the second audio controller, and the first signal generator is reused as the second signal generator.

In a possible embodiment of the present disclosure, the first unit includes a power amplifier configured to amplify the first electrical signal or the second electrical signal and transmit an amplified first electrical signal or an amplified second electrical signal to the ultrasonic transducer structure.

In a possible embodiment of the present disclosure, the third unit further includes a storage structure for storing audio information.

A dimming window assembly is further provided in embodiments of the present disclosure, including the above-mentioned ultrasonic dimming system.

In a possible embodiment of the present disclosure, the dimming window assembly further includes a personal computer (PC) terminal of a smart window electrically coupled with the ultrasonic dimming system.

In a possible embodiment of the present disclosure, the first unit includes a first audio controller and a first signal generator; and the first audio controller is configured to, in the first operation state, control the first signal generator to generate the first electrical signal, and in the second operation state, control the first signal generator to generate the second electrical signal; the PC terminal of the smart window is configured to provide reminder information to the first audio controller. The first audio controller controls the ultrasonic transducer structure to send out a directional ultrasonic wave to directionally broadcast the reminder information.

In a possible embodiment of the present disclosure, the dimming glass structure includes: a first electrode on the glass substrate, a second electrode opposite to the first electrode, and liquid crystals between the first electrode and the second electrode; the ultrasonic transducer structure includes a third electrode, a fourth electrode disposed opposite to the third electrode, and a piezoelectric film layer between the third electrode and the fourth electrode; and the second electrode is reused as the third electrode.

In a possible embodiment of the present disclosure, the dimming glass structure further includes a spacer between the first electrode and the second electrode; the spacer includes a plate-shaped substrate and an array of hollow areas in the plate-shaped substrate; the liquid crystals are in each hollow area; the fourth electrode includes an array of block electrodes, the block electrodes are corresponding to the hollow areas in a one-to-one manner; and a center point of each block electrode coincides with a center point of the corresponding hollow area; the hollow areas form piezoelectric film vibration cavities.

In a possible embodiment of the present disclosure, a cross section of the block electrode in a direction parallel to the glass substrate is circular; a cross section of the hollow area in the direction parallel to the glass substrate is circular; and a radius of the cross section of the block electrode is 0.65 to 0.75 times a radius of the cross section of the corresponding hollow area.

In a possible embodiment of the present disclosure, the block electrodes are corresponding to the hollow areas in a one-to-one manner in a direction perpendicular to the glass substrate.

BRIEF DESCRIPTION OF THE DRAWINGS

FIG. 8 shows a schematic diagram showing a state in which ultrasonic waves are reflected by obstacles in an embodiment of the present disclosure;

FIG. 9 shows a schematic diagram of transmitted ultrasonic signals and reflected ultrasonic signals in an embodiment of the present disclosure;

FIG. 10 shows a schematic diagram of a distribution of ultrasonic array units when directional sounding is performed in an embodiment of the present disclosure;

FIG. 11 shows a schematic diagram of ultrasonic waves when the directional sounding is performed in an embodiment of the present disclosure;

FIG. 12 shows a schematic diagram of a distribution of touch electrodes in an embodiment of the present disclosure;

FIG. 13 shows a partially enlarged schematic diagram of FIG. 12;

FIG. 14 shows a schematic diagram of an ultrasonic signal sequence when a finger slides up in an embodiment of the present disclosure;

DETAILED DESCRIPTION

To describe the objectives, the technical solutions and the characteristics of embodiments of the present disclosure more clearly, the technical solutions of embodiments of the present disclosure are described clearly and completely in conjunction with drawings of the embodiments of the present disclosure. Apparently, the described embodiments are merely a part of rather than all embodiments of the present disclosure. All other embodiments obtained by a person of ordinary skill in the art based on the described embodiments of the present disclosure, shall fall within the scope of the present disclosure.

In description of the present disclosure, it should be noted that an orientation or positional relationship indicated by terms such as "Central", "Up", "down", "left", "right", "vertical", "horizontal", "inside", "outside" are based on an orientation or positional relationship shown in drawings, and is only for convenience of describing the present disclosure and simplifying the description, and does not indicate or imply that devices or elements referred to must have a specific orientation and are constructed and operated in a specific orientation, so it cannot be understood as a limitation of the present disclosure. In addition, terms such as "first", "second", and "third" are only used for descriptive purposes, and cannot be understood as indicating or implying relative importance.

Figure 1:
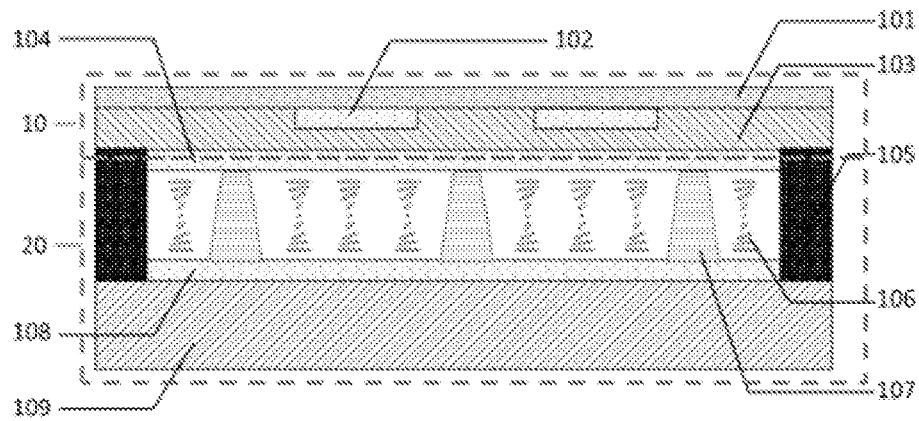
FIG. 1 shows one structural diagram of a dimming system in an embodiment of the present disclosure.
Figure 2:
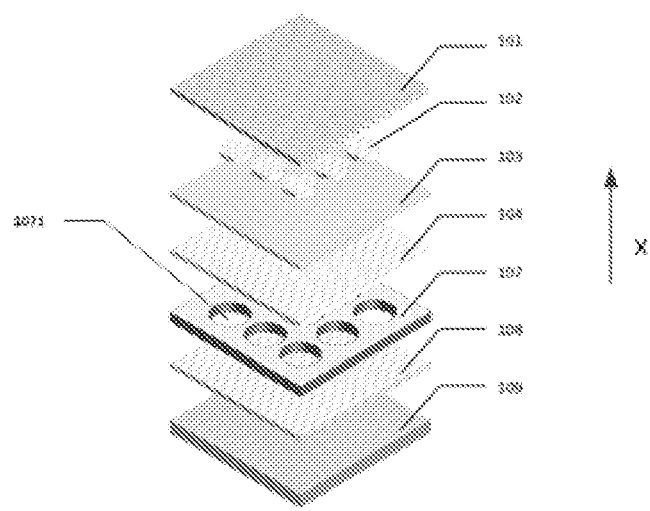
FIG. 2 shows another structural diagram of a dimming system in an embodiment of the present disclosure.

An ultrasonic dimming system is provided in an embodiment of the present disclosure. As shown in FIGS. 1 and 2, the ultrasonic dimming system includes a glass substrate 109, a dimming glass structure 20 and an ultrasonic transducer structure 10 sequentially disposed on the glass substrate 109, and a function processing module electrically coupled with the dimming glass structure 20 and the ultrasonic transducer structure 10.

The function processing module includes:

a first unit configured to, in a first operation state, generate a first electrical signal for locating a target object and send the first electrical signal to the ultrasonic transducer structure 10 to enable the ultrasonic transducer structure 10 to generate a first ultrasonic wave; and, in a second operation state, generate a second electrical signal for identifying a finger touch position and send the second electrical signal to the ultrasonic transducer structure 10 to enable the ultrasonic transducer structure 10 to generate a second ultrasonic wave;

a second unit configured to, in the first operation state, detect a reflected first ultrasonic wave to obtain target position information of the target object; and, in the second operation state, detect a reflected second ultrasonic wave to obtain the finger touch position information;

a third unit configured to, in the first operation state, control the ultrasonic transducer structure 10 to perform directional sounding for the target object according to the target position information;

a fourth unit configured to, in the second operation state, send a control signal to the dimming glass structure 20 to perform dimming according to the finger touch position information.

An ultrasonic wave is a mechanical wave with a higher vibration frequency than a sound wave, which is generated by a vibration of a transducer chip under an excitation of a voltage and has characteristics of good directionality and directional transmission. The ultrasonic wave has high penetrability to liquids and solids. When the ultrasonic wave encounters impurities or an interface, it may be reflected obviously and forms an echo. Due to a reverse effect, the transducer chip may generate voltage signals at two electrodes under an action of ultrasonic waves. Ultrasonic testing is widely used in industries, national defense, biomedicine, etc.

In the embodiment, the ultrasonic transducer structure 10 and the dimming glass structure 20 are integrated. Under a control of the function processing module, an ultrasonic touch identification is performed through the ultrasonic transducer structure 10 to realize touch dimming, and a directional sound transmission is further realized based on a high directivity of the ultrasonic waves, thereby increasing functions of a dimming glass and broadening application fields of the dimming glass.

In an exemplary embodiment, the dimming glass structure 20 includes a first electrode 108 and a second electrode 104 disposed oppositely. The first electrode 108 is disposed on the glass substrate 109. Liquid crystals are filled between the first electrode 108 and the second electrode 104.

The ultrasonic transducer structure 10 includes a third electrode and a fourth electrode 102 disposed oppositely and a piezoelectric film layer 103 disposed between the third electrode and the fourth electrode 102. The second electrode 104 is reused as the third electrode.

The presence of the ultrasonic transducer structure 10 can realize the touch dimming, and the second electrode 104 of the dimming glass structure 20 is reused as the third electrode of the ultrasonic transducer structure 10, thereby simplifying a structure of the ultrasonic dimming system.

In an exemplary embodiment, the piezoelectric film layer 103 may be made of aluminum nitride (AlN), and may be formed by a direct current magnetron reactive sputtering process.

In an exemplary embodiment, the liquid crystals are guest-host dye liquid crystals. The guest-host dye liquid crystals are formed by adding dichroic dyes to aligned liquid crystals. The dichroic dyes have different absorption rates for a polarized light in a direction perpendicular to a molecular axis and a polarized light in a direction parallel to the molecular axis, so that when a polarized light in one direction is absorbed, a polarized light in a direction perpendicular to the one direction can be transmitted. Taking positive dye liquid crystals as an example, when no electric field is applied, the dyes liquid crystals are parallel to the substrate, polarized lights are parallel to an absorption direction of the dyes, and the polarized lights are absorbed, then the dimming glass structure is in a dark state. When an electric field is applied, the dyes liquid crystals are perpendicular to the substrate, polarized lights are perpendicular to the absorption direction of the dyes, and the polarized light can be transmitted, then the dimming glass structure is in a bright state.

Figure 3:
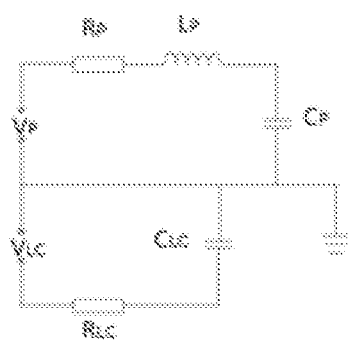
FIG. 3 shows a schematic diagram of an equivalent circuit of a dimming system in an embodiment of the present disclosure.

FIG. 3 shows an equivalent circuit of the dimming glass structure 20 and the ultrasonic transducer structure 10 in one embodiment. The fourth electrode 102, the piezoelectric film layer 103 and the second electrode 104 define a capacitor $C_P$ in FIG. 3. The second electrode 104, the liquid crystals 106 and the first electrode 108 define a capacitor $C_{LC}$ in FIG. 3. Resistors $R_P$ and $R_{LC}$ are resistances of wirings. $V_P$ and $V_{LC}$ are driving voltages of the ultrasonic transducer structure 10 and the liquid crystals 106, respectively. In a specific implementation, when $V_P=5V$, the capacitor formed by the third electrode (i.e., the second electrode 104) and the fourth electrode 102 of the ultrasonic transducer structure is charged (i.e., the capacitor $C_P$ is charged), so that the ultrasonic transducer structure is excited to sound. When $V_{LC}=24V$, the capacitor $C_{LC}$ is charged, the liquid crystals 106 are deflected under an action of an electric field, lights can pass through to present a bright state.

In an exemplary embodiment of the present disclosure, a spacer 107 is further disposed between the first electrode 108 and the second electrode 104. The spacer 107 includes a plate-shaped substrate. A plurality of hollow areas 1071 is defined in the plate-shaped substrate and arranged in an array. Each hollow area 1071 is filled with liquid crystals.

The fourth electrode 102 includes a plurality of block electrodes arranged in an array. The plurality of block electrodes are corresponding to the plurality of hollow areas 1071 in a one-to-one manner. As shown in FIG. 2, a center point of each block electrode coincides with a center point of one corresponding hollow area 1071.

Figure 4:
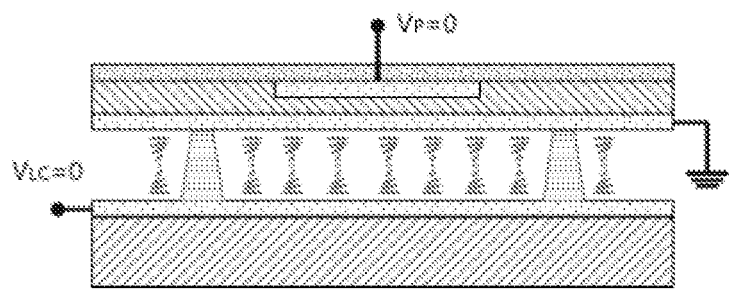
FIG. 4 shows a schematic diagram of a dimming structure in a dark state in an embodiment of the present disclosure.
Figure 5:
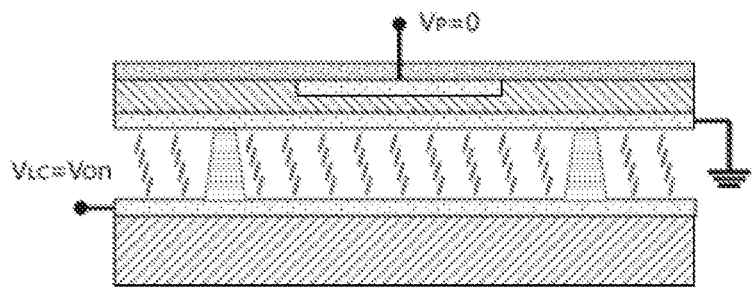
FIG. 5 shows a schematic diagram of a dimming structure in a bright state in an embodiment of the present disclosure.

In some implementations of the embodiment, taking positive dye liquid crystals as an example, when no electric field is applied, the second electrode 104 is grounded, the first electrode has no input, the dye liquid crystals are parallel to the glass substrate 109 and lights are absorbed, thereby presenting the dark state. An alternating current signal with a voltage of 24V and a frequency within a range of 60 Hz to 240 Hz is applied to the first electrode, the dye liquid crystals are deflected under an action of an electric field until the dye liquid crystals are arranged perpendicular to the glass substrate, so that lights can be transmitted, thereby presenting a bright state, as shown in FIGS. 4 and 5.

In an exemplary embodiment, the spacer 107 is made of a transparent resin, and is exposed and developed through a mask to form an array of rings with resin walls (i.e., forming an array of hollow areas 1071 in the plate-shaped substrate). The spacer 107 not only realizes a supporting function between the first electrode 108 and the second electrode 104, but also forms a piezoelectric film vibration cavity, which has functions of supporting a liquid crystal cell and forming a vibration cavity.

A piezoelectric sound generator in the related art forms a vibration cavity by etching a sacrificial layer. Meanwhile, during a manufacturing process, an etching barrier layer needs to be fabricated, and thus the process is complicated. However in the embodiment, the vibration cavity is formed by exposing the spacer made of resin, and has a simple structure and fewer film layers. By integrating the ultrasonic transducer structure 10 into the dimming glass structure 20, a high extent of integration of touch control, directional sounding and dimming functions can be achieved with low cost and complexity as compared with external touch control and sounding components.

In an exemplary embodiment, a cross section of each block electrode of the fourth electrode 102 in a direction parallel to the glass substrate 109 is circular; a cross section of the hollow area 1071 in the direction parallel to the glass substrate 109 is circular. A radius of the cross section of each block electrode of the fourth electrode 102 is 0.65 to 0.75 times a radius of the cross section of the corresponding hollow area 1071, thereby ensuring an emission energy of the ultrasonic transducer structure 10. In an implementation of the embodiment, the radius of the cross section of each block electrode of the fourth electrode 102 is 0.7 times the radius of the cross section of the corresponding hollow area 1071, at this point, the emission energy of the ultrasonic transducer structure 10 is the highest, referring to FIG. 2.

In an exemplary embodiment, a thickness of the plate-shaped substrate in a direction (referring to an X direction in FIG. 2) perpendicular to the glass substrate is within a range of 10 um to 25 um; a distance between two adjacent hollow areas 1071 is within a range of 5um to 10 um; a distance between center points of two adjacent hollow areas is 100 um; the radius of the cross section of each hollow area is within a range of 45 um to 47.5 um; and the radius of each block electrode is within a range of 35 um to 37.5 um.

In an exemplary embodiment, at least some of the block electrodes of the fourth electrode 102 are touch electrodes. The touch electrodes include a plurality of transmitting electrodes and a plurality of receiving electrodes.

When the finger touch position information includes finger sliding along a first direction, reflected ultrasonic signals are received by the plurality of receiving electrodes according a first time sequence, and the dimming glass structure 20 is controlled by the fourth unit to present a dark state.

When the finger touch position information includes finger sliding along a second direction opposite to the first direction, reflected ultrasonic signals are received by the plurality of receiving electrodes according to a second time sequence, the dimming glass structure 20 is controlled by the fourth unit to present a bright state. The second time sequence is opposite to the first time sequence.

In the embodiment, in order to simplify structures, only some of the block electrodes of the fourth electrode 102 are used as touch electrodes. In FIG. 12, an area where the touch electrodes are located is a lower left corner of the fourth electrode 102, but not limited to this. In other words, when the ultrasonic dimming system is applied to a structure such as a window, an area where the touch electrode is located may be any local area as long as it is convenient for users to touch for achieving touch control.

In the embodiment, touch control is achieved through gesture recognition, but it is not limited to this, for example, point touch may also be used.

Figure 15:
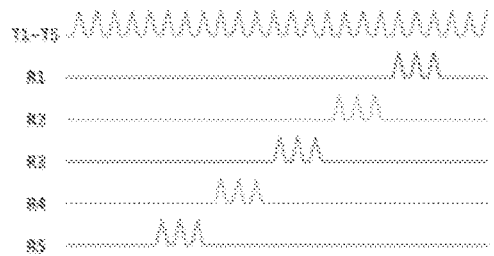
FIG. 15 shows a schematic diagram of an ultrasonic signal sequence when a finger slides down in an embodiment of the present disclosure.

In the embodiment, numbers, arrangements, and positions of the transmitting electrodes and the receiving electrodes may be set according to actual needs. For example, in an implementation of the embodiment, the touch electrodes are arranged in an array of 2×5. The positions of the touch electrodes are shown in FIG. 12. FIG. 13 is a partially enlarged schematic diagram of FIG. 12. T1 to T5 in FIG. 13 represent transmitting electrodes, which are configured to transmit continuous ultrasonic pulse signal. R1 to R5 in FIG. 13 represent receiving electrodes, which are configured to detect reflected ultrasonic waves. During operation, the transmitting electrodes T1 to T5 simultaneously emit ultrasonic pulse signals. When a finger slides upward (i.e., sliding in a direction from T1 to T5), moments when the receiving electrodes R1 to R5 receive a first reflected ultrasonic wave signal, are postponed in a postpone sequence from R1 to R5, as shown in FIG. 14. The function processing module sends instructions according to the foregoing postpone sequence, thereby reducing a driving voltage of the dimming glass structure to enable the dimming glass structure to change from the bright state to the dark state. When the finger slides downward (i.e., sliding in a direction from T5 to T1), moments when the receiving electrodes R5 to R1 receive a first reflected ultrasonic wave signal are postponed in a postpone sequence from R5 to R1, as shown in FIG. 15. The function processing module sends instructions according to the foregoing postpone sequence, thereby increasing the driving voltage of the dimming glass structure to enable the dimming glass structure to change from the dark state to the bright state.

In an exemplary embodiment, a sealant 105 is disposed between the first electrode 108 and the second electrode 104, and the sealant 105 surrounds the spacer 107, referring to FIG. 1.

In an exemplary embodiment, a transparent flexible substrate film layer 101 is further disposed on a side of the fourth electrode 102 away from the third electrode.

The transparent flexible substrate film layer 101 supports and fixes the fourth electrode 102, and also functions as a vibration diaphragm.

Figure 6:
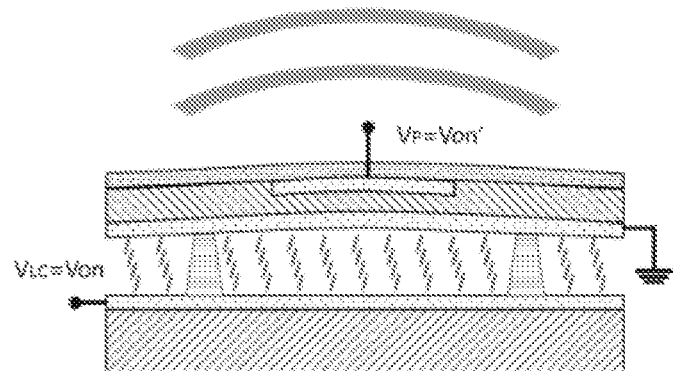
FIG. 6 shows a schematic diagram showing a state in which a dimming structure is in a bright state and an ultrasonic transducer structure is sounding in an embodiment of the present disclosure.
Figure 7:
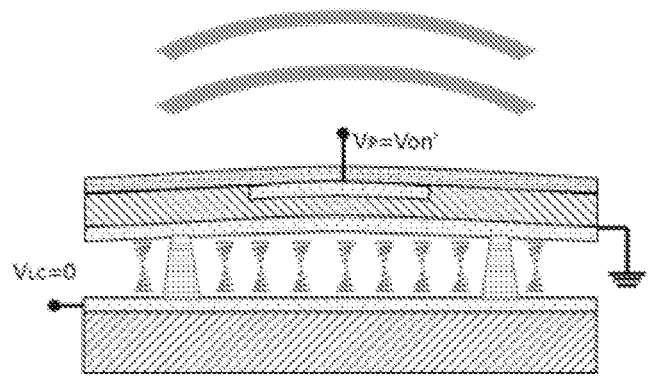
FIG. 7 shows a schematic diagram showing a state in which a dimming structure is in a dark state and an ultrasonic transducer structure is sounding in an embodiment of the present disclosure.

When an alternating current voltage, such as a voltage of 5V and a frequency of 40 KHz, is applied to upper and lower surfaces of the piezoelectric film layer 103 (i.e., applying the alternating current voltage to the third electrode and the fourth electrode 102), the piezoelectric film layer 103 has a transverse inverse piezoelectric effect, and then the piezoelectric film layer 103 extends or contracts radially. The transparent flexible substrate film layer 101 does not have piezoelectric effect, and will not be deformed when a driving signal is applied. When no driving signal is applied, neither the piezoelectric film layer 103 nor the transparent flexible substrate film layer 101 is deformed, no vibration is generated at this time. When an alternating current signal is applied to the fourth electrode 102 and the third electrode (i.e., the second electrode 104) is grounded, the piezoelectric film layer 103 contracts and extends periodically in a radial direction. When the piezoelectric film layer 103 extends radially, an upper surface of the piezoelectric film layer 103 is obstructed by the transparent flexible substrate film layer 101 and presents a downward depression. When the piezoelectric film layer 103 contracts radially, the upper surface of the piezoelectric film layer 103 is obstructed by the transparent flexible substrate film layer 101, the contraction is suppressed, and the transparent flexible substrate film layer 101 presents an upward convex. Referring to FIGS. 6 and 7, through up and down vibrations of the flexible substrate film layer 101, external mediums are excited to vibrate and propagate along a vibration direction, thereby generating a sound wave. When a frequency of the alternating current signal is greater than 20 kHz, the generated sound waves are ultrasonic waves.

An ultrasonic wave may be reflected at different interfaces. A reflected ultrasonic wave can cause vibration of film layers of the ultrasonic transducer structure 10. The piezoelectric film layer 103 expands and contracts radially. Due to the piezoelectric effect, a voltage signal is generated between the upper and lower electrodes of the piezoelectric film layer 103, and is fed back to the function processing module for subsequent processing, thereby realizing capture of an external feedback sound wave signal.

In the embodiment, in order to reduce an influence on a dimming performance, transparent polyimide (CPI), PET, etc. may be used as a manufacturing material of the flexible substrate film layer 101.

In some implementations of the embodiment, transparent polyimide (CPI) is used to manufacture the flexible substrate film 101 with a thickness of 40 μm, and AlN is used to manufacture the piezoelectric film 103 with a thickness of 10 μm. The third electrode (i.e., the second electrode 104) and the fourth electrode 102 on opposite surfaces of the film layer 103 are made of Indium Tin Oxide (ITO) (in one embodiment, the first electrode 108 is also made of ITO). Thicknesses of each of the third electrode and the fourth electrode 102 is 0.5 μm. A resonance frequency "f" and a film thickness "h" (which is a sum of the thickness of the piezoelectric film 103 and the thickness of the flexible substrate film layer 101), a vibration diaphragm radius "a" (which is a radius of the cross section of each of the hollow areas 1071 in the direction parallel to the glass substrate 109) satisfy the following relationship:

$$f \propto \frac{h}{a^2}$$

That is, the resonance frequency "f" is proportional to the vibration diaphragm thickness and inversely proportional to a square of the radius of the vibration diaphragm. Since thicknesses of the third electrode and the fourth electrode 102 are very small and have little effect on vibration, to simplify a calculation, the thicknesses of the third electrode and the fourth electrode 102 are ignored. After calculation, in a case that the thickness of the piezoelectric film layer 103 is 10 μm, when the thickness of the flexible substrate film layer 101 is 40 μm and the vibration diaphragm radius is 100 μm, the resonance frequency is about 40 KHz.

In an exemplary embodiment, the first unit includes a first audio controller and a first signal generator. The first audio controller is configured to, in the first operation state, control the first signal generator to generate a first electrical signal; and in the second operation state, control the first signal generator to generate a second electrical signal.

In an exemplary embodiment, the third unit includes a second audio controller and a second signal generator. The second audio controller is configured to transmit an acquired audio signal to the second signal generator. The second signal generator modulates the audio signal and an ultrasonic carrier frequency signal to obtain a modulated signal.

In an exemplary embodiment, the first audio controller is reused as the second audio controller, and the first signal generator is reused as the second signal generator.

In an exemplary embodiment, the first unit includes a power amplifier configured to amplify the first electrical signal, the second electrical signal and the modulated signal, and transmit the amplified first electrical signal, the amplified second electrical signal and the amplified modulated signal to the ultrasonic transducer structure 10, for providing power for the ultrasonic transducer structure 10

In an exemplary embodiment of the present disclosure, the third unit further includes a storage structure for storing audio information.

The storage structure may be a personal computer (PC) terminal electrically coupled with the first audio controller, but it is not limited to this.

In the embodiment, the ultrasonic dimming system further includes a power supply to provide a stable voltage output.

Figure 16:
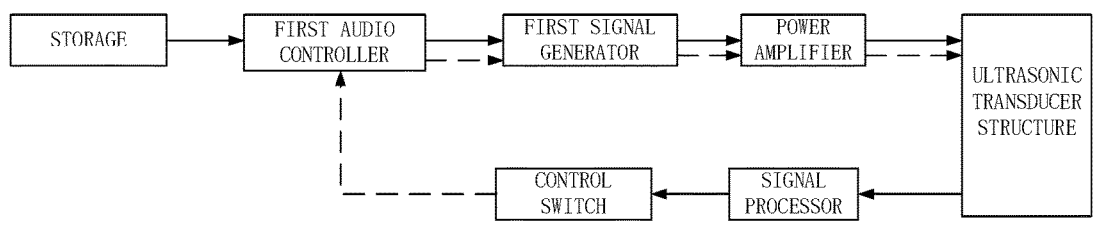
FIG. 16 shows a flow chart of directional sounding in an embodiment of the present disclosure.
Figure 17:
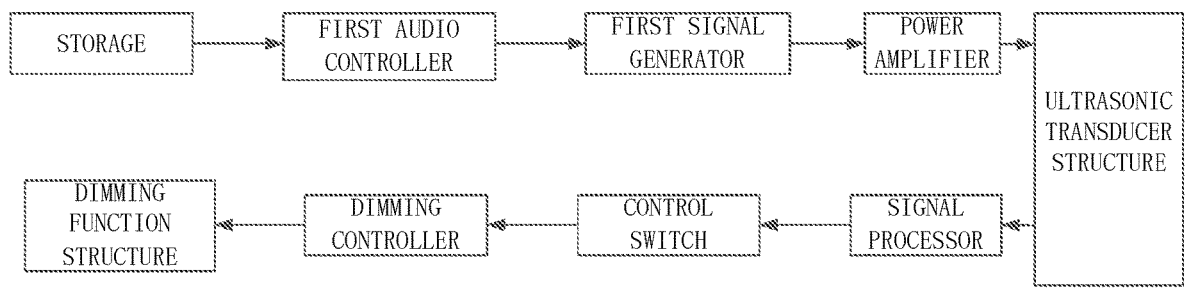
FIG. 17 shows a flow chart of dimming in an embodiment of the present disclosure.

The second unit, the third unit and the fourth unit may be set separately or integrated. In an implementation of the embodiment, the second unit, the third unit and the fourth unit are integrated as one, which includes a signal processor and a control switch. The signal processor is configured to, when performing a directional sounding, process reflected ultrasonic waves to obtain target position information of a target object, generate a first time sequence for the ultrasonic transducer structure to receive the ultrasonic carrier frequency signal and the modulated signal, and transmit the first time sequence to the control switch via serial communication. The control switch sends the first time sequence to the first audio controller. Referring to FIG. 16, the first audio controller loads an audible audio signal onto an ultrasonic carrier frequency signal, controls the first signal generator to send out a reference ultrasonic signal and an ultrasonic signal loaded with the audible audio signal according to the first time sequence, and controls the ultrasonic transducer structure to perform the directional sounding. The signal processor is further configured to, during a touch dimming, process the reflected ultrasonic waves to obtain finger touch position information. In the embodiment, gesture identification is adopted, that is, corresponding dimming is performed according to a direction of a finger sliding. Therefore, the signal processor sends an acquired postpone sequence in which the receiving electrodes receive ultrasonic signals (recording the postpone sequence as a second time sequence) to the control switch. The control switch generates a dimming instruction according to the second time sequence, and sends the dimming instruction to a dimming controller. The dimming controller determines driving voltages of the first electrode and the second electrode according to the dimming instruction. Under voltages output by the dimming controller, the liquid crystals deflects to realize dimming (bright state or dark state), referring to FIG. 17.

Operation principle and operation process of the ultrasonic dimming system in the embodiment are specifically introduced.

The operation principle of the dimming glass structure 20 in the embodiment is as follows.

Taking positive dye liquid crystals as an example, when no electric field is applied, the second electrode 104 is grounded, the first electrode 108 has not input, the dye liquid crystals are parallel to the glass substrate 109 and lights are absorbed, thereby presenting the dark state. When an alternating current signal with a voltage of 24V and a frequency within a range of 60 Hz to 240 Hz, is applied to the first electrode 108, the dye liquid crystals are deflected under an action of an electric field until the he dye liquid crystals are arranged perpendicular to the glass substrate 109, so that lights can be transmitted, thereby presenting a bright state, as shown in FIGS. 4 and 5.

In combination with the ultrasonic transducer structure 10, it is necessary to first obtain the finger touch position information through the ultrasonic transducer structure 10, and then implement a corresponding dimming function according to the finger touch position information.

For example, in some embodiments of the embodiment, touch dimming is realized through gesture identification. Some of the block electrodes of the fourth electrode 102 are used as touch electrodes. In an implementation of the embodiment, the touch electrodes are arranged in an array of 2×5. The positions of the touch electrodes are shown in FIG. 12. FIG. 13 is a partially enlarged schematic diagram of FIG. 12. T1 to T5 in FIG. 13 represent transmitting electrodes, which are configured to transmit continuous ultrasonic pulse signal. R1 to R5 in FIG. 13 represent receiving electrodes, which are configured to detect reflected ultrasonic waves. During operation, the transmitting electrodes T1 to T5 simultaneously emit ultrasonic signals. When a finger slides upward, moments when the receiving electrodes R1 to R5 receive a first reflected ultrasonic wave signal, are postponed in a postpone sequence from R1 to R5, as shown in FIG. 14. The function processing module sends instructions according to the foregoing postpone sequence, thereby reducing a driving voltage of the dimming glass structure to enable the dimming glass structure to change from the bright state to the dark state. When the finger slides downward, moments when the receiving electrodes R5 to R1 receive a first reflected ultrasonic wave signal are postponed in a postpone sequence from R5 to R1, as shown in FIG. 15. The function processing module sends instructions according to the foregoing postpone sequence, thereby increasing the driving voltage of the dimming glass structure to enable the dimming glass structure to change from the dark state to the bright state.

Regarding the directional sounding, an ultrasound-based sound directional propagation technology is a new sound source technology that allows sound to propagate in form of beams along a certain direction. A basic principle is to modulate an audible sound signal onto an ultrasonic carrier signal and transmit it into the air by an ultrasonic transducer. During propagations of ultrasonic waves with different frequencies ($f_0, f_1$) in the air, due to a non-linear acoustic effect of the air, signals will interact and self-demodulate, thereby generating new sound waves whose frequencies include original ultrasonic frequencies $f_0$ and $f_1$, a sum of the original ultrasonic frequencies (i.e., a sum of $f_1+f_0$), and a difference of the original ultrasonic frequencies (a difference frequency of $f_1-f_0$). In a case that the ultrasonic carrier signal is selected appropriately, the sound waves with difference frequency ($f_1-f_0$) may fall in an audible frequency range, and then an audible sound wave may be obtained. In this way, the sound directional propagation is realized based on high directivity of the ultrasonic waves, so that the audible sound wave travels to a specific location, thereby achieving an effect of being heard only in a specific area.

In the embodiment, to achieve the directional sounding, it is necessary to first obtain the target position information of the target object. In the embodiment, the ultrasonic transducer structure 10 is divided into a plurality of ultrasonic array units according to an array of block electrodes included in the fourth electrode 102. Taking an i-th unit in the ultrasonic array units as an example, the first audio controller controls the first signal generator to generate a pulse signal. For example, the first signal generator generates two voltage pulse signals with a frequency of 40 kHz, which are amplified by the power amplifier and transmitted to the ultrasonic transducer structure 10. Due to inverse piezoelectric effect, the ultrasonic transducer structure 10 converts pulse signals into ultrasonic waves, and transmits them into the air. The ultrasonic waves have high directivity and propagate directionally along a vibration direction. Due to a difference in impedance between a human body and the air, the ultrasonic waves are reflected by the human body, and the reflected ultrasonic signals are received by the ultrasonic transducer structure 10 again. Then, the upper and lower electrodes (i.e., the third electrode and the fourth electrode 102) of the piezoelectric film layer 103 generate a voltage signal, and transmit the voltage signal to the function processing module. The function processing module processes a time difference $\Delta Ti$ between the transmitted and received signals, and calculates a distance from a reflection position to the i-th ultrasonic array unit through a formula $Si=(Vi*\Delta Ti)/2$, where $Vi$ is a sound velocity of sound waves in the air. The above is an operation process of a single ultrasonic array unit. When multiple ultrasonic array units are turned on column by column and scanned in sequence, a time difference matrix $\Delta T(X,Y)$ of an array of $(X_1,Y_1)$ to $(Xn,Yn)$ is collected. Received signals of the arrays may be processed and stored (in a register of the signal processor), thereby realizing recording of person's position information, where X and Y are row number and column number of a corresponding ultrasonic array unit, referring to FIGS. 8 to 10. FIG. 8 is a schematic diagram showing a state in which ultrasonic waves are reflected by obstacles. FIG. 9 is corresponding to FIG. 8, and FIG. 9 shows an ultrasonic pulse 100 transmitted by the ultrasonic array unit in FIG. 8 and a reflected ultrasonic pulse 200.

The target object in the above example is a human, which is used to illustrate a process of obtaining target position information, but it is not limited to this.

In the embodiment, the ultrasonic transducer structure 10 is divided into a plurality of ultrasonic array units according to an array of block electrodes included in the fourth electrode 102. When the ultrasonic dimming system in the embodiment performs the directional sounding, ultrasonic signals transmitted by different ultrasonic array units are recorded as A (X, Y) and B (X, Y). As shown in FIG. 10, the ultrasonic array units corresponding to ultrasonic signals A and B are staggered. A reference ultrasonic signal (i.e., the ultrasonic carrier frequency signal) of a frequency f0 such as 40 KHz is applied to the third electrode and the fourth electrode 102 of the ultrasonic array unit corresponding to the ultrasonic signal A., Taking the reference ultrasonic signal being a sinusoidal signal as an example, then, $$A(X, Y) = A_0 \cdot \sin\left(f_0 \cdot t + \frac{\Delta T(X, Y)}{2}\right), \text{ where } \frac{\Delta T(X, Y)}{2}$$

represents an initial phase, t represents a time, and A0 represents an amplitude.

It should be noted that (X, Y) in the $$\frac{\Delta T(X, Y)}{2}$$

only represents coordinate information of the ultrasonic transducer unit that transmits the ultrasonic signal A (X, Y), that is, in fact, the initial phase is $$\frac{\Delta T}{2}.$$

A modulated ultrasonic signal (i.e., the modulated signal) of a frequency $f_1$ is loaded to the third electrode and the fourth electrode 102 of the ultrasonic array unit corresponding to the ultrasonic signal B., where $f_1=f_0+\Delta f$, $\Delta f$ is a frequency of an audible signal (i.e., the frequency of the loaded audible signal). The audible audio signal is loaded onto the reference ultrasonic signal via an amplitude modulator to form a modulated signal:

$$B(X, Y) = A_0 \cdot \sin\left(f_1 \cdot t + \frac{\Delta T\ (X, Y)}{2}\right)$$

According to the acquired target position information, an ultrasonic phased array is used to adjust the initial phase $$\frac{\Delta T}{2}$$

of the ultrasonic wave transmitted by the ultrasonic array unit, thereby ensuring that a wave plane points to a position of a listener (i.e., a position of the target object). Referring to FIG. 11, a transverse line in FIG. 11 represents a wave plane. Directions of the ultrasonic signal A and the ultrasonic signal B are the same. In a case that the target object is in front of the ultrasonic dimming system (i.e., a direction at one side of the flexible substrate film layer 101 in FIG. 11 away from the glass substrate and perpendicular to the glass substrate), then $\Delta T=0$. Under an incoherent effect of the sound wave in the air, audible sound waves are generated and accepted by human ear, thereby realizing a directional transmission of sound information.

A dimming window assembly is further provided in one embodiment of the present disclosure, and includes the foregoing ultrasonic dimming system.

Hereinafter, a specific description will be given with a scenario in which the dimming window assembly in the embodiment is applied to a side window on a train. But the dimming window assembly in the embodiment is not limited to being applied to windows on the train.

Currently, China Railway has implemented a real-name system. When passengers purchase tickets, the system may obtain information such as passengers' seats and destinations. Taking Z35 train from Beijing to Guangzhou as an example, the train runs at night for some time.

When the train runs at night, street lights or neon lights in a town are strong at night. When the train goes through the town, there may be frequent changes of light and dark outside a window, which may easily cause discomfort to eyes of the passengers and affect rest of the passengers. At this point, the passengers may swipe up in front of a gesture identification area (i.e., a touch electrode setting area), and the ultrasonic transducer structure 10 feeds back reflected ultrasonic signals to the signal processor. After the reflected ultrasonic signals are processed by the signal processor, a time sequence is transmitted to the controller switch. The controller switch sends an instruction to the dimming controller to dim to the dark state. After the dimming controller receives a dimming instruction, the dimming controller reduces the driving voltage of the dimming glass structure, so that the dimming glass becomes dark to prevent outside light from entering. When the train runs during a day, lights outside are bright, the passengers may swipe down in front of the gesture identification area, and the ultrasonic transducer structure feeds back reflected ultrasonic signals to the signal processor. After the reflected ultrasonic signals are processed by the signal processor, a time sequence in which the receiving electrodes receive the ultrasonic signals is transmitted to the controller switch. The controller switch sends an instruction to the dimming controller to dim to the bright state. After the dimming controller receives a dimming instruction, the dimming controller increases the driving voltage of the dimming glass structure, so that the dimming glass becomes bright, and brightness in the train is improved.

The train arrives at Changsha Station at 1:43 in the morning, and an arrival broadcast may affect rest of other passengers. When adopting the dimming window assembly of the embodiment, the railway system uploads information such as passengers' seats, arrival information, and destination weather to a smart window PC terminal before the train runs. When a destination of a passenger A at a seat No. 6 is Changsha and destinations of passengers at seats No. 5 and 7 are Guangzhou, before arriving at Changsha Station, the smart window uses the foregoing target position information identification function to capture a head position of the passenger at the seat No. 6, and stores coordinate information (i.e., storing target position information of the passenger's head in form of coordinates) in the first audio controller. At the same time, the first audio controller controls the ultrasonic transducer structure to send directional ultrasonic waves to the passenger to remind the passenger that he is about to arrive at the station, take his belongings, prepare to get off the train, and inform destination weather conditions and other information to facilitate the passenger to add or remove clothing, etc. Due to the directional sounding, passengers in other positions will not hear the broadcast, which will not affect their rest.

The above are some embodiments of the present disclosure. The above embodiments are for illustrative purposes only, but the present disclosure is not limited thereto. Obviously, a person skilled in the art may make further modifications and improvements without departing from the principle of the present disclosure, and these modifications and improvements shall also fall within the scope of the present disclosure.

What is claimed is:

1. An ultrasonic dimming system, comprising: a glass substrate, a dimming glass structure and an ultrasonic transducer structure sequentially disposed on the glass substrate, and a function processing module electrically coupled with the dimming glass structure and the ultrasonic transducer structure;

wherein the function processing module comprises:
a first unit configured to, in a first operation state, generate a first electrical signal for locating a target object and send the first electrical signal to the ultrasonic transducer structure to enable the ultrasonic transducer structure to generate a first ultrasonic wave; and, in a second operation state, generate a second electrical signal for identifying a finger touch position and send the second electrical signal to the ultrasonic transducer structure to enable the ultrasonic transducer structure to generate a second ultrasonic wave;

a second unit configured to, in the first operation state, detect a reflected first ultrasonic wave to obtain target position information of the target object; and, in the second operation state, detect a reflected second ultrasonic wave to obtain finger touch position information;
a third unit configured to, in the first operation state, control the ultrasonic transducer structure to perform directional sounding for the target object according to the target position information;
a fourth unit configured to, in the second operation state, send a control signal to the dimming glass structure to perform dimming according to the finger touch position information,
wherein the dimming glass structure comprises: a first electrode on the glass substrate, a second electrode opposite to the first electrode, and liquid crystals between the first electrode and the second electrode;
the ultrasonic transducer structure comprises a third electrode, a fourth electrode disposed opposite to the third electrode, and a piezoelectric film layer between the third electrode and the fourth electrode; and the second electrode is reused as the third electrode.

2. The ultrasonic dimming system according to claim 1, wherein the dimming glass structure further comprises a spacer between the first electrode and the second electrode; the spacer comprises a plate-shaped substrate and an array of hollow areas in the plate-shaped substrate; the liquid crystals are in each hollow area;
the fourth electrode comprises an array of block electrodes, the block electrodes are corresponding to the hollow areas in a one-to-one manner; and a center point of each block electrode coincides with a center point of the corresponding hollow area.

3. The ultrasonic dimming system according to claim 2, wherein a cross section of the block electrode in a direction parallel to the glass substrate is circular; a cross section of the hollow area in the direction parallel to the glass substrate is circular; and a radius of the cross section of the block electrode is 0.65 to 0.75 times a radius of the cross section of the corresponding hollow area.

4. The ultrasonic dimming system according to claim 2, wherein a thickness of the plate-shaped substrate in a direction perpendicular to the glass substrate is within a range of 10 um to 25 um; a distance between two adjacent ones of the hollow areas is within a range of 5 um to 10 um; and the radius of the cross section of each hollow area is within a range of 45 um to 47.5 um.

5. The ultrasonic dimming system according to claim 2, wherein at least part of the block electrodes of the fourth electrode are touch electrodes; the touch electrodes comprise a plurality of transmitting electrodes and a plurality of receiving electrodes;
in case that the finger touch position information comprises finger sliding along a first direction, reflected ultrasonic signals are received by the plurality of receiving electrodes according to a first time sequence, and the dimming glass structure is controlled by the fourth unit to present a dark state;
in case that the finger touch position information comprises finger sliding along a second direction opposite to the first direction, reflected ultrasonic signals are received by the plurality of receiving electrodes according to a second time sequence, and the dimming glass structure is controlled by the fourth unit to present a bright state; the second time sequence is opposite to the first time sequence.

6. The ultrasonic dimming system according to claim 2, wherein a sealant is disposed between the first electrode and the second electrode, and the sealant surrounds the spacer.

7. The ultrasonic dimming system according to claim 1, wherein a transparent flexible substrate film layer is further disposed on a side of the fourth electrode away from the third electrode.

8. The ultrasonic dimming system according to claim 1, wherein the first unit comprises a first audio controller and a first signal generator; and the first audio controller is configured to, in the first operation state, control the first signal generator to generate the first electrical signal, and in the second operation state, control the first signal generator to generate the second electrical signal.

9. The ultrasonic dimming system according to claim 8, wherein the third unit comprises a second audio controller and a second signal generator; the second audio controller is configured to transmit an acquired audio signal to the second signal generator; and the second signal generator modulates the audio signal and an ultrasonic carrier frequency signal to obtain a modulated signal.

10. The ultrasonic dimming system according to claim 9, wherein the first audio controller is reused as the second audio controller, and the first signal generator is reused as the second signal generator.

11. The ultrasonic dimming system according to claim 8, wherein the first unit comprises a power amplifier configured to amplify the first electrical signal or the second electrical signal and transmit an amplified first electrical signal or an amplified second electrical signal to the ultrasonic transducer structure.

12. The ultrasonic dimming system according to claim 8, wherein the third unit further comprises a storage structure for storing audio information.

13. A dimming window assembly, comprising an ultrasonic dimming system;
wherein the ultrasonic dimming system comprises a glass substrate, a dimming glass structure and an ultrasonic transducer structure sequentially disposed on the glass substrate, and a function processing module electrically coupled with the dimming glass structure and the ultrasonic transducer structure;
wherein the function processing module comprises:
a first unit configured to, in a first operation state, generate a first electrical signal for locating a target object and send the first electrical signal to the ultrasonic transducer structure to enable the ultrasonic transducer structure to generate a first ultrasonic wave; and, in a second operation state, generate a second electrical signal for identifying a finger touch position and send the second electrical signal to the ultrasonic transducer structure to enable the ultrasonic transducer structure to generate a second ultrasonic wave;
a second unit configured to, in the first operation state, detect a reflected first ultrasonic wave to obtain target position information of the target object; and, in the second operation state, detect a reflected second ultrasonic wave to obtain finger touch position information;
a third unit configured to, in the first operation state, control the ultrasonic transducer structure to perform directional sounding for the target object according to the target position information;
a fourth unit configured to, in the second operation state, send a control signal to the dimming glass structure to perform dimming according to the finger touch position information, wherein the dimming glass structure comprises: a first electrode on the glass substrate, a second electrode opposite to the first electrode, and liquid crystals between the first electrode and the second electrode;

the ultrasonic transducer structure comprises a third electrode, a fourth electrode disposed opposite to the third electrode, and a piezoelectric film layer between the third electrode and the fourth electrode; and the second electrode is reused as the third electrode.

14. The dimming window assembly according to claim 13, further comprising a personal computer (PC) terminal of a smart window electrically coupled with the ultrasonic dimming system.

15. The dimming window assembly according to claim 14, wherein the first unit comprises a first audio controller and a first signal generator; and the first audio controller is configured to, in the first operation state, control the first signal generator to generate the first electrical signal, and in the second operation state, control the first signal generator to generate the second electrical signal;

the PC terminal of the smart window is configured to provide reminder information to the first audio controller; and the first audio controller controls the ultrasonic transducer structure to send out a directional ultrasonic wave to directionally broadcast the reminder information.

16. The dimming window assembly according to claim 13, wherein the dimming glass structure further comprises a spacer between the first electrode and the second electrode; the spacer comprises a plate-shaped substrate and an array of hollow areas in the plate-shaped substrate; the liquid crystals are in each hollow area;

the fourth electrode comprises an array of block electrodes, the block electrodes are corresponding to the hollow areas in a one-to-one manner; and a center point of each block electrode coincides with a center point of the corresponding hollow area;

the hollow areas form piezoelectric film vibration cavities.

17. The dimming window assembly according to claim 16, wherein a cross section of the block electrode in a direction parallel to the glass substrate is circular; a cross section of the hollow area in the direction parallel to the glass substrate is circular; and a radius of the cross section of the block electrode is 0.65 to 0.75 times a radius of the cross section of the corresponding hollow area.

18. The dimming window assembly according to claim 16, wherein the block electrodes are corresponding to the hollow areas in a one-to-one manner in a direction perpendicular to the glass substrate.

* * * * *